US012782653B2

(12) United States Patent
Kajiya et al.

(10) Patent No.: US 12,782,653 B2
(45) Date of Patent: Nov. 3, 2026

(54) INTEGRATED OPTICAL MODULE

(71) Applicant: Mitsubishi Electric Corporation, Tokyo (JP)

(72) Inventors: Satoshi Kajiya, Isahaya (JP); Yudai Imai, Isahaya (JP)

(73) Assignee: Mitsubishi Electric Corporation, Tokyo (JP)

( * ) Notice: Subject to any disclaimer, the term of this patent is extended or adjusted under 35 U.S.C. 154(b) by 287 days.

(21) Appl. No.: 18/579,232

(22) PCT Filed: Aug. 25, 2021

(86) PCT No.: PCT/JP2021/031073
§ 371 (c)(1),
(2) Date: Jan. 12, 2024

(87) PCT Pub. No.: WO2023/026380
PCT Pub. Date: Mar. 2, 2023

(65) Prior Publication Data
US 2024/0319453 A1 Sep. 26, 2024

(51) Int. Cl.
*G02B 6/42* (2006.01)
*G02B 6/293* (2006.01)

(52) U.S. Cl.
CPC ......... *G02B 6/4215* (2013.01); *G02B 6/4239* (2013.01); *G02B 6/29367* (2013.01); *G02B 6/2938* (2013.01)

(58) Field of Classification Search
CPC G02B 6/4215; G02B 6/4239; G02B 6/29367; G02B 6/2938
(Continued)

(56) References Cited

U.S. PATENT DOCUMENTS

2001/0013641 A1* 8/2001 Onodera ............. H10W 74/012 257/667
2014/0133862 A1 5/2014 Fujimura et al.
(Continued)

FOREIGN PATENT DOCUMENTS

CN 106950650 A 7/2017
CN 110350393 A 10/2019
(Continued)

OTHER PUBLICATIONS

An Office Action; "Notice of Reasons for Refusal," mailed by the Japanese Patent Office on Dec. 3, 2024, which corresponds to Japanese Patent Application No. 2023-543538 and is related to U.S. Appl. No. 18/579,232; with English language translation.
(Continued)

*Primary Examiner* — Jerry M Blevins
(74) *Attorney, Agent, or Firm* — Studebaker Brackett PLLC

(57) ABSTRACT

A mounting surface of a housing of an integrated optical module includes a first bonding region to which a first bonding material for bonding a loading part on which a plurality of light emitting elements are loaded is to be applied, and a second bonding region to which a second bonding material for bonding an optical multiplexer is to be applied. On the mounting surface, a bonding material outflow blocking part for blocking bonding material outflow is provided between the first bonding region and the second bonding region. The bonding material outflow blocking part extends in a direction intersecting with but not orthogonal to an incident direction of an optical signal, and in advancement along the extending direction thereof, the distance from a side of a bonding surface of the loading part along the incident direction of the optical signal increases.

14 Claims, 10 Drawing Sheets

(58) Field of Classification Search
USPC .......................................................... 385/39
See application file for complete search history.

(56) References Cited

U.S. PATENT DOCUMENTS

| | | | | | |
|---|---|---|---|---|---|
| 2017/0115459 | A1* | 4/2017 | Kamo | ................ | G02B 6/29365 |
| 2018/0062757 | A1 | 3/2018 | Watanabe | | |
| 2023/0022318 | A1 | 1/2023 | Kaneko | | |

FOREIGN PATENT DOCUMENTS

| | | | | | |
|---|---|---|---|---|---|
| JP | 2001-230274 | A | | 8/2001 | |
| JP | 2009218280 | A | * | 9/2009 | ............ H10W 72/30 |
| JP | 2010-066514 | A | | 3/2010 | |
| JP | 2013123016 | A | * | 6/2013 | ............ H10W 72/30 |
| JP | 2014-095843 | A | | 5/2014 | |
| JP | 2017-083597 | A | | 5/2017 | |
| JP | 2019-087656 | A | | 6/2019 | |
| JP | 2019-186328 | A | | 10/2019 | |
| JP | 6804698 | B1 | | 12/2020 | |
| WO | 2016/143725 | A1 | | 9/2016 | |

OTHER PUBLICATIONS

An Office Action mailed by the Japanese Patent Office on Jun. 11, 2024, which corresponds to Japanese Patent Application No. 2023-543538 and is related to U.S. Appl. No. 18/579,232; with English language translation.

International Search Report issued in PCT/JP2021/031073; mailed Nov. 16, 2021.

An Office Action; mailed by the China National Intellectual Property Administration of the People's Republic of China on Aug. 1, 2026, which corresponds to Chinese Patent Application No. 202180101660.7 and is related to U.S. Appl. No. 18/579,232.

* cited by examiner

INTEGRATED OPTICAL MODULE

TECHNICAL FIELD

The present disclosure relates to an integrated optical module.

BACKGROUND ART

In recent years, with the expansion of services using the Internet, the introduction of optical fiber communication has been advanced in order to cope with a rapid increase in the amount of information communication. In the optical fiber communication, the demand for an optical transmission system that achieves high-speed and large-capacity transmission is increasing, and in particular, a wavelength multiplex optical transmission system in which a plurality of optical signals having different wavelengths are bundled into one optical fiber and transmitted and received is widely adopted. In the wavelength multiplex optical transmission system, an integrated optical module is used, which is installed in an optical transmission apparatus, in which a plurality of light emitting elements having different wavelengths and an optical multiplexer for multiplexing the plurality of optical signals emitted from the plurality of light emitting elements are incorporated in the same package, and which performs communication by bundling the plurality of optical signals into one optical fiber. In order to further increase the capacity of the optical transmission system, it is necessary to mount a large number of integrated optical modules in the optical transmission apparatus, and in order to increase the mounting density of components in the optical transmission apparatus, the integrated optical module is required to be miniaturized. This is also accelerating the increase in mounting density within the integrated optical module.

For example, in Patent Document 1, the miniaturization of an optical multiplexer is achieved by mounting the light emitting elements of the respective mounting substrate close to each other to pair the adjacent light emitting elements, which enables the miniaturization of the optical multiplexer. This enables miniaturization of the integrated optical module.

CITATION LIST

Patent Literature

Patent document 1: Japanese Patent Publication No. 6804698

SUMMARY OF INVENTION

Problems to be Solved by Invention

In order to miniaturize the integrated optical module, it is preferable to dispose the optical multiplexer close to a loading part on which the plurality of light emitting elements are mounted. Here, the loading part and the optical multiplexer are bonded to a mounting surface of a housing with different bonding materials. When the loading part and the optical multiplexer are bonded to the bonding surface of the housing, if one bonding material flows out and is mixed with the other bonding material, the bonding property of the other bonding material is deteriorated, thereby causing the assembly failure of the integrated optical module. Therefore, it is necessary to provide a blocking structure for preventing the bonding material from flowing out to a region between the loading part and the optical multiplexer on the mounting surface of the housing. However, even if a blocking structure is provided, the effect of blocking the outflow of the bonding material may not be sufficiently achieved.

For example, in a case where the blocking structure is formed by a laser mark drawn on the mounting surface by a laser, that is, the mark by a laser marking, the wall surface of the housing is an obstacle to the laser marking to be drawn on the mounting surface of the housing from directly above, and thus a gap is generated between the wall face of the housing and the laser marking. Therefore, there is a possibility that one bonding material flows out from the gap to a region where the other bonding material is applied, and the bonding materials are mixed.

The present disclosure has been made to solve the above-described problem, and an object of the present disclosure is to provide an integrated optical module in which mixing of different bonding materials is prevented, thereby reducing the failure rate of assembly of loaded components.

Means for Solving Problems

An integrated optical module disclosed in the present application includes a housing including a mounting surface, and a first side wall and a second side wall that are continuous from the mounting surface and face each other, a plurality of light emitting elements to emit optical signals each having a different wavelength, a loading part on which the plurality of light emitting elements are loaded, and an optical multiplexer to multiplex the optical signals emitted from the plurality of light emitting elements. The mounting surface of the housing includes a first bonding region to which a first bonding material for bonding the mounting surface of the housing and the loading part is to be applied, and a second bonding region to which a second bonding material for bonding the mounting surface of the housing and the optical multiplexer is to be applied. A bonding surface of the optical multiplexer to be bonded to the mounting surface has a first side parallel to a direction intersecting with but not orthogonal to an incident direction of the plurality of optical signals to the optical multiplexer. A bonding surface of the loading part to be bonded to the mounting surface has a second side facing the first side. A bonding material outflow blocking part is provided on the mounting surface of the housing between the first bonding region and the second bonding region to block bonding material outflow. The loading part and the optical multiplexer are arranged between the first side wall and the second side wall such that the respective bonding surfaces do not overlap in a direction in which the first side wall and the second side wall face each other. The first side is provided such that a distance between the first side and the second side along a direction parallel to the incident direction increases in advancement along the first side from a first side wall side toward a second side wall side. The bonding material outflow blocking part includes a portion extending in a direction intersecting with but not orthogonal to the incident direction, and the portion is provided such that a distance between the portion and the bonding surface of the loading part along a direction parallel to the incident direction increases in advancement along the extending direction of the portion from the first side wall side to the second side wall side.

Advantageous Effect of Invention

According to the present disclosure, since mixing of different bonding materials can be prevented, it is possible to reduce the failure rate of assembly of loaded components in an integrated optical module.

DETAILED DESCRIPTION OF THE EMBODIMENTS

Embodiment 1

An integrated optical module according to Embodiment 1 will be described with reference to FIG. 1 to FIG. 4.

Figure 1:
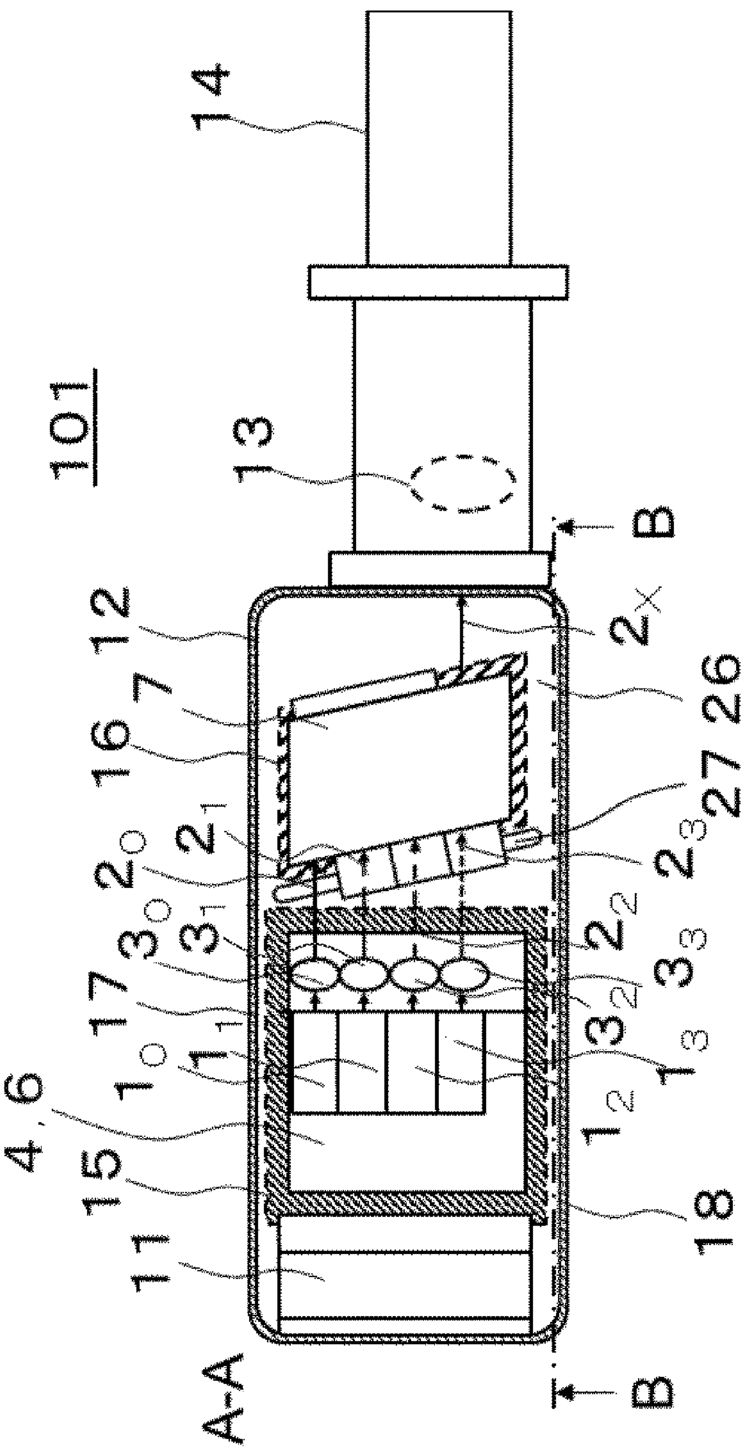
FIG. 1 is an external top view showing an overall structure of an integrated optical module according to Embodiment 1 of the present disclosure.
Figure 2:
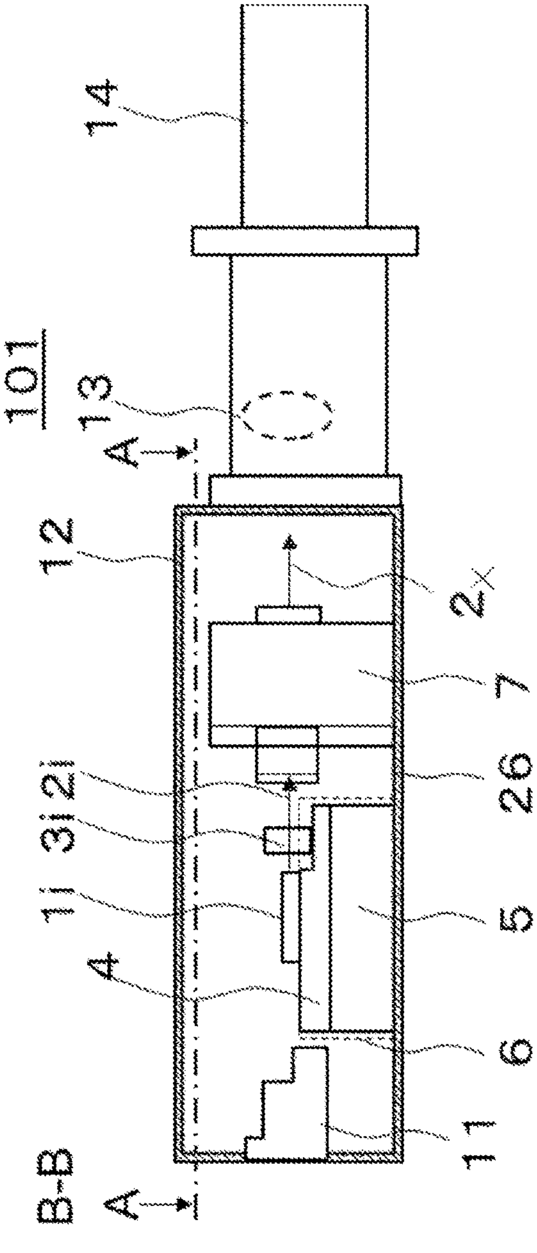
FIG. 2 is an external side view showing the overall structure of the integrated optical module according to Embodiment 1 of the present disclosure.

FIG. 1 and FIG. 2 are a top view and a side view, respectively, showing external appearances of an integrated optical module 101. Note that FIG. 1 shows a state in which an upper portion of a housing 12 is removed at a line A-A shown in FIG. 2. FIG. 2 shows a state in which a side wall of the housing 12 is removed at a line B-B shown in FIG. 1.

As shown in FIG. 1 and FIG. 2, the integrated optical module 101 includes a light emitting element 1*i*, a collimating lens 3*i*, a loading part 6, an optical multiplexer 7, a connector 11, a housing 12, a condenser lens 13, and a receptacle 14. The light emitting element 1*i* constituted with a laser diode or the like and converts an electrical signal into an optical signal 2*i*. The collimating lens 3*i* collimates the optical signal 1*i* emitted from the light emitting element 2*i*. The loading part 6 includes a loading member 4 and a temperature adjusting element 5, and loads the light emitting element 1*i* and the collimating lens 3*i*. The temperature adjusting element 5 with the light emitting element 1*i*, the collimating lens 3*i*, and the loading member 4 mounted thereon is bonded to the housing 12. The temperature adjusting element 5 is constituted with a Peltier element or the like, and keeps the temperature of the light emitting element 1*i* constant. The loading member 4 is disposed on the temperature adjusting element 5, and the light emitting element 1*i* and the collimating lens 3*i* are mounted on the top surface of the loading member 4. The loading member 4 is formed of a metal block, and as will be described later, a plurality of light emitting elements 1*i* and a plurality of collimating lenses 3*i* are provided.

As an interface with the outside, the connector 11 is connected to two flexible printed circuits (FPCs) or the like (not shown). One of the FPCs is used for radio frequency (RF) connection for transmitting a high-frequency electrical signal, and the other FPC is used for direct current (DC current) connection for supplying power to the light emitting element 1*i* or the like. The electrical signal received by the connector 11 is supplied to the light emitting element 1*i*. The electrical signal is a signal indicating information transmitted via an optical fiber. The optical multiplexer 7 receives and multiplexes the optical signals 2*i* emitted from the respective plurality of light emitting elements 1*i* via the plurality of collimating lenses 3*i*. The housing 12 accommodates the light emitting element 1*i*, the collimating lens 3*i*, the loading part 6, and the optical multiplexer 7 in the inside sealed therein. The connector 11 is attached to a side wall of the housing 12.

The receptacle 14 is coupled to the housing 12 and an optical fiber (not shown) and holds the condenser lens 13 therein. The condenser lens 13 condenses the optical signal $\mathbf{2}_x$ emitted from the optical multiplexer 7 to the receptacle 14. The light condensed by the condenser lens 13 enters the optical fiber from the receptacle 14.

As shown in FIG. 1, the loading part 6 is loaded with the plurality of light emitting elements 1*i* that emit the optical signals 2*i* having different wavelengths and the plurality of collimating lenses 3*i* that collimate the plurality of optical signals 2*i* emitted from the plurality of light emitting elements 1*i*. A suffix i is a number indicating a lane number (also referred to as a channel number) of the integrated optical module, and is 0, 1, 2, or 3 in the present example. That is, i=0, 1, 2, 3. The plurality of light emitting elements 1*i* are arranged side by side in a direction orthogonal to the direction in which the optical signals are emitted, and the plurality of collimating lenses 3*i* are also arranged side by side in the same direction as the light emitting elements 1*i*.

Figure 3A:
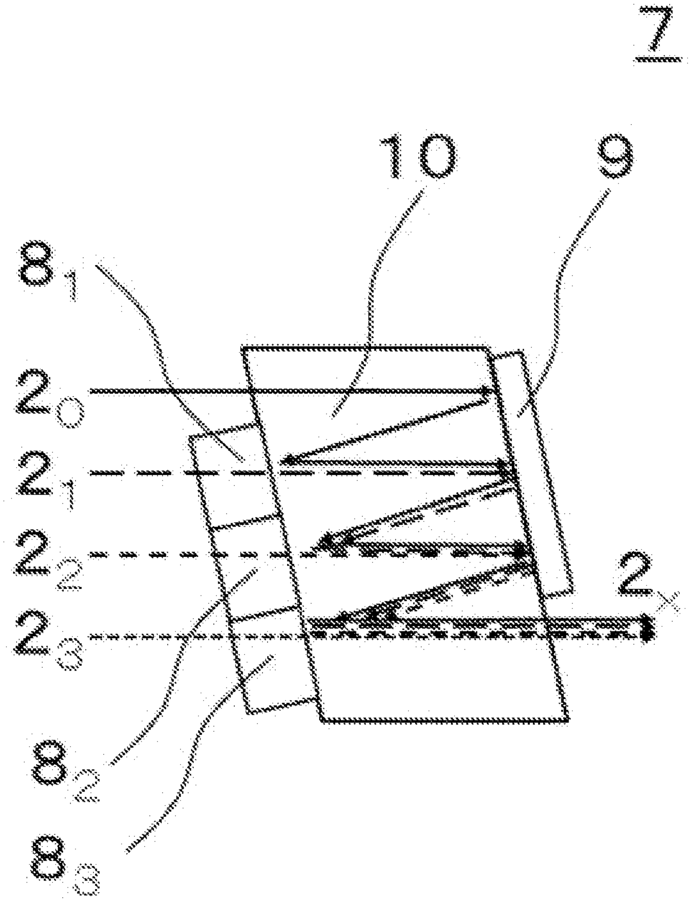
FIG. 3A is a top view that show a configuration of an optical multiplexer of the integrated optical module according to Embodiment 1 of the present disclosure.
Figure 3B:
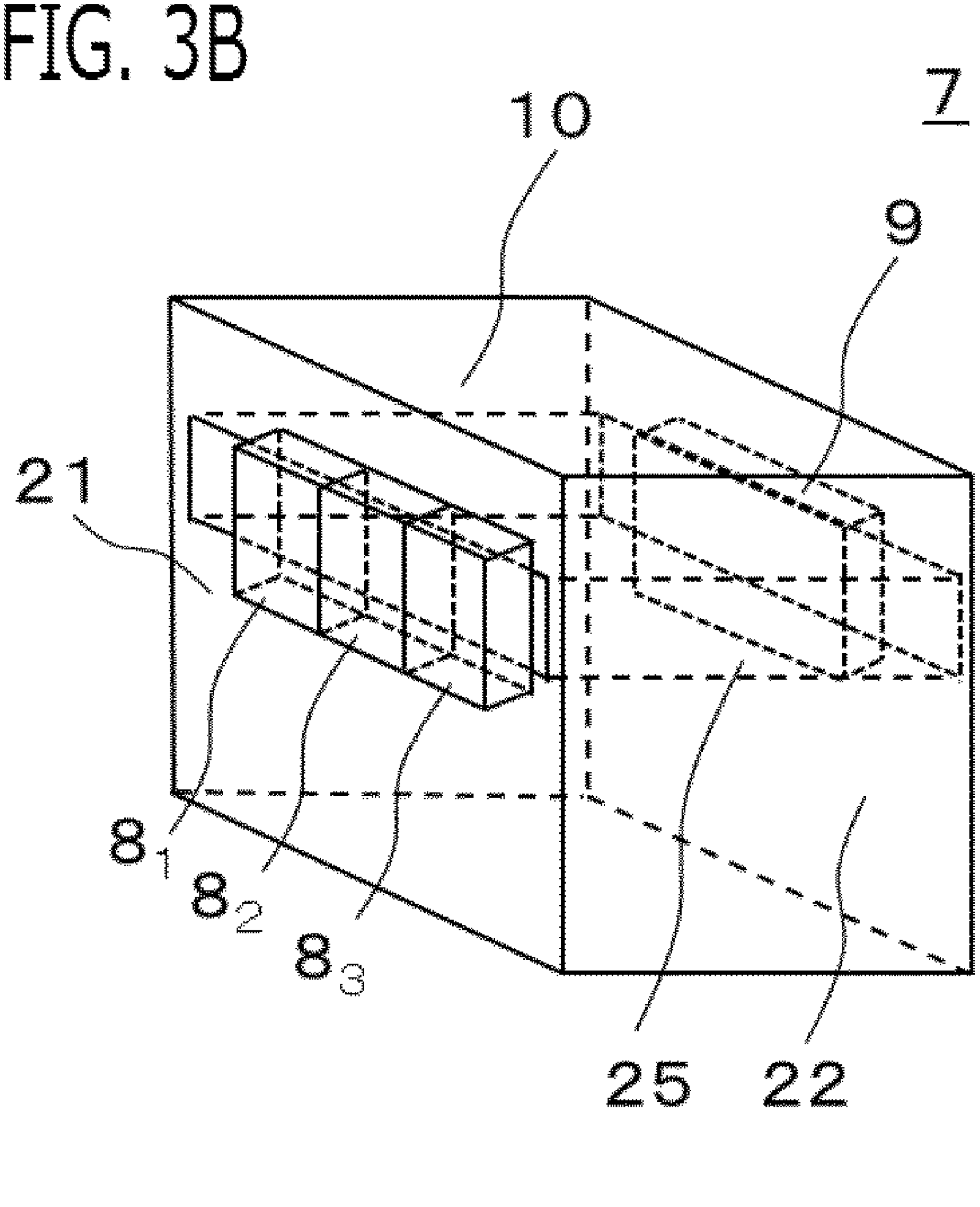
FIG. 3B is a perspective view that show a configuration of an optical multiplexer of the integrated optical module according to Embodiment 1 of the present disclosure.

FIG. 3A is a top view of the optical multiplexer 7. FIG. 3B is a perspective view of the optical multiplexer 7. As shown in FIG. 3A,3B, the optical multiplexer 7 includes a filter 8*i* that transmits the optical signal 2*i* of a wavelength of a lane i and reflects the optical signals 2*i* of the other wavelengths, a mirror 9 that is positioned on the opposite side of the filter 8*i* and reflects the optical signals 2*i* of all the wavelengths, and a holder 10 that fixes the filter 8*i* and the mirror 9 on two parallel faces so as to face each other. Note that, although a filter 80 for the lane 0 may be provided, the present embodiment shows a case where the filter 80 is not provided and three filters 81, 82, and 83 are provided.

The plurality of optical signals 2*i* travel in parallel to each other and enter the optical multiplexer 7. The holder 10 has a shape of a square pole whose bottom surface is a parallelogram, and has two parallel surfaces, that is, a first face 21 and a second face 22 along an intersecting direction that is not orthogonal to the incident direction of the plurality of optical signals 2*i*. The holder 10 is provided with a hollowed-out portion 25 passing through the first face 21 and the second face 22, which is along the incident direction of the optical signal 2*i*. The hollowed-out portion 25 serves as an optical path of an optical signal. The three filters $8_1$, $8_2$, and $8_3$ are fixed side by side on the first face 21, which is on the side for receiving the optical signal 2*i*, so as to cover a part of the hollowed-out portion 25. The mirror 9 is fixed to the second face 22 so as to cover a part of the hollowed-out portion 25.

The optical signal $2_0$ is reflected by the mirror 9 and is incident on the filter $8_1$. The filter $8_1$ transmits the optical signal $2_1$ and reflects the incident optical signal $2_0$. As a result, the multiplexed optical signals $2_0$ and $2_1$ are emitted from the filter $8_1$. The multiplexed optical signals $2_0$ and $2_1$ are reflected by the mirror 9 and are incident on the filter $8_2$. The filter $8_2$ transmits the optical signal $2_2$ and reflects the incident optical signals $2_0$ and $2_1$. As a result, the multiplexed optical signals $2_0$ to $2_2$ are emitted from the filter $8_2$. The multiplexed optical signals $2_0$ to $2_2$ are reflected by the mirror 9 and enter the filter $8_3$. The filter $8_3$ transmits the optical signal $2_3$ and reflects the incident optical signals $2_0$ to $2_2$. As a result, the multiplexed optical signals $2_0$ to $2_3$ are emitted from the filter $8_3$ as the optical signal $2_x$.

In this way, the plurality of optical signals 1*i* emitted from the respective plurality of light emitting elements 2*i* are incident on the optical multiplexer 7, and are multiplexed by multiple reflection between the filter 8*i* and the mirror 9. A band-pass filter (BPF) or the like is used as the filter 8*i*. The mirror 9 is formed of a dielectric multilayer film on a glass substrate by vapor deposition or the like.

Referring again to FIG. 1 and FIG. 2, the housing 12 is integrally formed of metal and ceramic. The housing 12 includes a mounting surface 26 on which the loading part 6 and the optical multiplexer 7 are mounted, and side walls that are continuous from the mounting surface 26 and surround the loading part 6 and the optical multiplexer 7. Two portions of the side walls facing each other are a first side wall 17 and a second side wall 18. The housing 12 and the receptacle 14 are fixed to each other by welding or the like.

Figure 4:
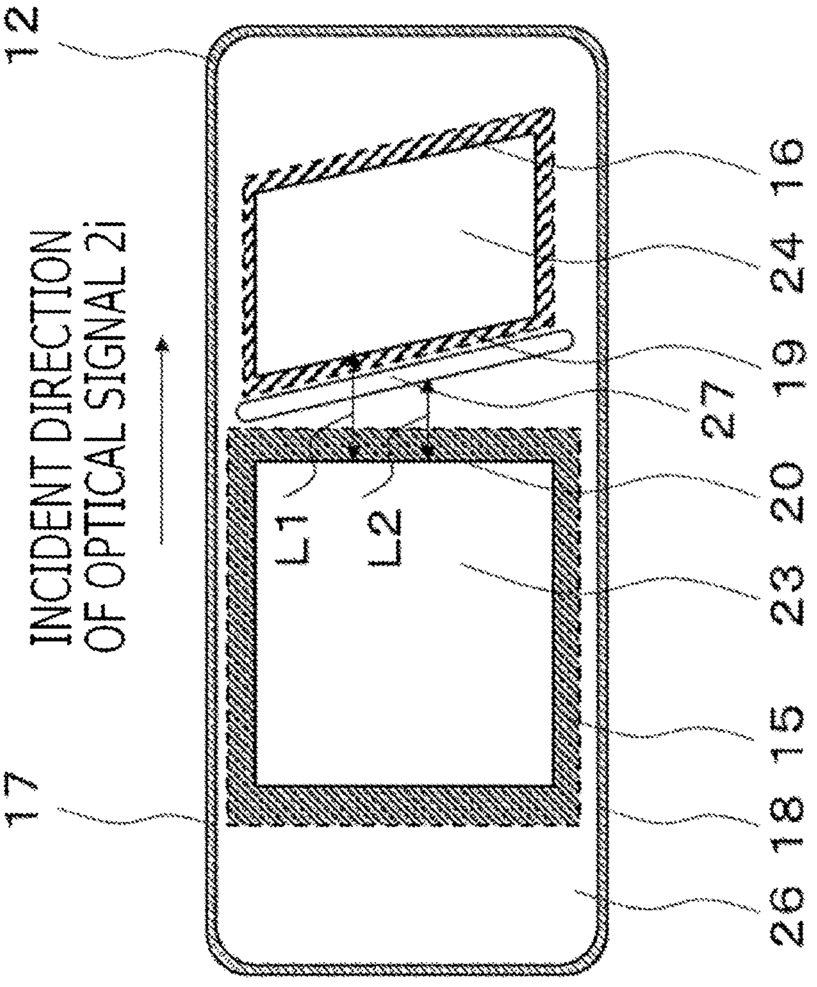
FIG. 4 is a plan view showing a configuration of a mounting surface of a housing in the integrated optical module according to Embodiment 1 of the present disclosure.

FIG. 4 is a diagram showing the mounting surface 26 of the housing 12 extracted from FIG. 1. As shown in FIG. 4, the mounting surface 26 includes a first bonding region 15 to which a first bonding material is applied to bond the loading part 6 and a second bonding region 16 to which a second bonding material is applied to bond the optical multiplexer 7. The first bonding material and the second bonding material are applied so as not to overlap each other. Bottom surfaces of the loading part 6 and the optical multiplexer 7 are bonded to the mounting surface of the housing 12 as a first bonding surface 23 and a second bonding surface 24, respectively. The loading part 6 and the optical multiplexer 7 are arranged close to each other between the first side wall 17 and the second side wall 18 such that the first bonding surface 23 and the second bonding surface 24 do not overlap each other in a direction in which the first side wall 17 and the second side wall 18 face each other. Further, the incident direction of the optical signal 2*i* on the optical multiplexer 7 is parallel to the surfaces of the first side wall 17 and the second side wall 18.

The second bonding surface 24 is in the shape of a parallelogram, and has two sides parallel to a direction intersecting with but not orthogonal to the incident direction of the optical signal 2*i* to the optical multiplexer 7. The side facing the bonding surface of the loading part 6 is referred to as a first side 19. On the other hand, the first bonding surface 23 has a rectangular shape and has two sides orthogonal to the incident direction of the optical signal 2*i* to the optical multiplexer 7, and the side facing the first side 19 is referred to as a second side 20.

Regarding the first side 19, a distance L1 between the first side and the second side 20 along the direction parallel to the incident direction of the optical signal 2*i* increases in advancement along the first side 19 from the first side wall 17 side toward the second side wall 18 side. The mounting surface 26 of the housing 12 is made of, for example, metal, while the first bonding surface 23 corresponds to the lower surface of the temperature adjusting element 5 and is made of metal. Therefore, solder is used as the first bonding material. Further, the second bonding surface 24 corresponds to the lower surface of the holder 10 made of glass. Therefore, a UV curable adhesive is used as the second bonding material. As described above, when members made of different materials are bonded to the mounting surface 26 made of the same material, the bonding materials for the respective members are also different.

Next, a bonding material outflow blocking part will be described. The bonding material outflow blocking part is provided on the mounting surface 26 of the housing 12 and blocks bonding material outflow. In this embodiment, the bonding material outflow blocking part is provided in particular to prevent the first bonding material from penetrating into the second bonding region 16 and mixing with the second bonding material. For example, the bonding material outflow blocking part is a laser marking 27 in which the surface of the object is modified in order for the surface thereof to become rough by irradiating the object with a laser beam. Since the laser marking 27 is rougher than the other part of the mounting surface 26, the bonding material can be repelled. The laser marking 27 is drawn on the mounting surface of the housing 12 from directly above, and is provided between the first bonding region 15 and the second bonding region 16 along a direction that is parallel to the mounting surface of the housing 12 and the first side 19 of the bonding surface of the optical multiplexer 7.

That is, in Embodiment 1, as shown in FIG. 4, the laser marking 27 extends along a direction intersecting with but not orthogonal to the incident direction of the optical signal 2*i* to the optical multiplexer 7, and a distance L2 between the laser marking 27 and the bonding surface of the loading part 6 along the direction parallel to the incident direction of the optical signal increases in advancement along the extending direction from the first side wall 17 side toward the second side wall 18 side.

For the drawing of the laser marking 27, a laser marking device that radiates a laser in a direction perpendicular to the mounting surface 26 is used. However, the first side wall 17 and the second side wall 18 serve as a barrier, and it is difficult to irradiate portions in contact with the first side wall 17 and the second side wall 18 with the laser. Therefore, the laser marking 27 is provided away from the first side wall 17 and the second side wall 18, and gaps through which the bonding material easily flows are formed between the laser marking 27 and the first side wall 17 and between the laser marking 27 and the second side wall 18.

Note that, for drawing the laser marking 27, a laser marking device used for marking a serial number of the integrated optical module 101 or a serial number of a component such as the housing 12 can be used.

A method of bonding a component to the housing 12, which is a part of the method of manufacturing the integrated optical module 101, will be described. First, the housing 12 in which the laser marking 27 is performed on the mounting surface 26, the loading part 6 on which the plurality of light emitting elements 1*i* are mounted, and the optical multiplexer 7 are prepared. Next, the loading part 6 is pressed to the mounting surface 26 with solder as the first bonding material interposed therebetween, and then the solder is melted, whereby the first bonding region 15 protrudes from the bonding surface of the loading part 6. Thereafter, the solder is solidified, whereby the loading part 6 is bonded to the mounting surface 26. Then, the optical multiplexer 7 is pressed to the mounting surface 26 on the side opposite to the loading part 6 with respect to the laser marking 27, with the UV curable adhesive as the second bonding material interposed therebetween. By the pressing of the optical multiplexer 7, the second bonding region 16 protrudes from the bonding surface of the optical multiplexer 7. Thereafter, the UV-curable adhesive is cured by irradiation with ultraviolet rays, whereby the optical multiplexer 7 is bonded to the mounting surface 26. When the first bonding material is melted, the first bonding material may flow out beyond the laser marking 27 through the gaps between the laser marking 27 and the side walls.

If the laser marking 27 is drawn along the second side 20 of the first bonding surface 23, since the region between the loading part 6 and the laser marking 27 on the mounting surface 26 is narrow, the flow of the melted first bonding material is concentrated in the gaps between the laser marking 27 and the side walls. In particular, since the gap generated on the side of the first side wall 17 is located at a position close to the second bonding region 16, there is a high possibility that the melted first bonding material flows out from the gap to the second bonding region 16 that is a region to which the second bonding material is to be applied later. When the second bonding material is applied onto the first bonding material that has flowed out, that is, when the first bonding material and the second bonding material are mixed with each other, the bonding property of the second bonding material is deteriorated, and it is difficult to successfully bond the optical multiplexer 7 to the mounting surface 26.

In contrast, in Embodiment 1, the laser marking 27 is drawn in parallel to the first side 19 of the second bonding surface 24. As a result, the region between the loading part 6 and the laser marking 27 spreads from the first side wall 17 side toward the second side wall 18 side. The amount of the first bonding material that can be accumulated between the loading part 6 and the laser marking 27 increases, and the concentration of the flow of the first bonding material in the gap between the laser marking 27 and the first side wall 17 is alleviated. Therefore, it is possible to suppress the first bonding material from flowing out to the second bonding region 16.

Note that the bonding material outflow blocking part may not be provided in parallel to the first side 19 of the second bonding surface 24, and thus the angle between the direction in which the bonding material outflow blocking part extends and the direction in which the second side 20 extends may be smaller or larger than the angle between the direction of extension of the first side 19 and the direction of extension of the second side 20. The bonding material outflow blocking part should have a portion extending along a direction intersecting with but not orthogonal to the incident direction of the optical signal 2*i* to the optical multiplexer 7, and the portion should have a shape by which the distance from the bonding surface of the loading part 6 along the direction parallel to the incident direction increases in advancement along the extending direction of the portion from the first side wall 17 side toward the second side wall 18 side.

The first bonding material is prevented from flowing out to the second bonding region 16 through the gap between the laser marking 27 and the first side wall 17.

Embodiment 2

Figure 5:
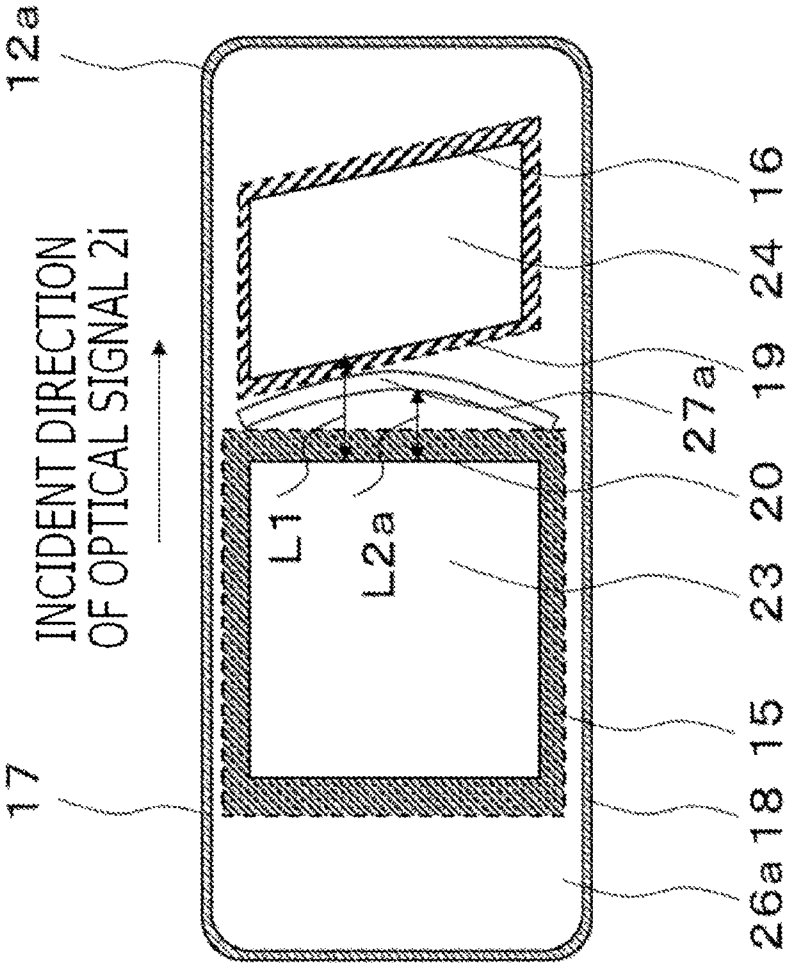
FIG. 5 is a plan view showing a configuration of a mounting surface of a housing in an integrated optical module according to Embodiment 2 of the present disclosure.

A housing of an integrated optical module according to Embodiment 2 will be described with reference to FIG. 5. FIG. 5 shows a mounting surface 26*a* of a housing 12*a* of the integrated optical module according to the present embodiment. Referring to FIG. 5, the mounting surface 26*a* of the housing 12*a* is different from the mounting surface 26 of FIG. 4 in the shape of a laser marking 27*a*. Other configurations and functions of the integrated optical module are the same as those of the integrated optical module 101 of Embodiment 1, and therefore, detailed description thereof will not be repeated.

In Embodiment 2, the laser marking 27*a* is provided so as to be curved. As shown in FIG. 5, the laser marking 27*a* is curved in the incident direction of the optical signal 2*i*, and the curvature of the laser marking 27*a* is the largest at the center of the laser marking 27*a*, i.e., at a point equidistant from both ends of the laser marking 27*a* along the laser marking 27*a* and decreases from the center of the laser marking 27*a* toward the both ends. The laser marking 27*a* has a line-symmetric shape with respect to a line passing through the center of the laser marking 2*i* along the incident direction of the optical signal 27*a*. The laser marking 27*a* is provided away from the first side wall 17 and the second side wall 18.

The portion from the end closest to the first side wall 17 to the center in the laser marking 27*a* extends along a direction intersecting with but not orthogonal to the incident direction of the optical signal 2*i* to the optical multiplexer 7, and a distance L2*a* between the laser marking 27*a* and the bonding surface of the loading part 6 along the direction parallel to the incident direction increases in advancement from the first side wall 17 side toward the second side wall 18 side. As a result, the region between the loading part 6 and the laser marking 27*a* spreads from the end of the laser marking 27*a* toward the center thereof. The amount of the first bonding material that can be accumulated between the loading part 6 and the laser marking 27*a* increases, and the concentration of the flow of the first bonding material in the gap between the laser marking 27*a* and the first side wall 17 is alleviated. Therefore, it is possible to suppress the first bonding material from flowing out to the second bonding region 16.

The bonding material outflow blocking part is not limited to the shape of the laser marking 27*a* shown in FIG. 4. It may be curved in a direction different from the incident direction of the optical signal 2*i*, and it is not necessary that the curvature is the largest at the center of the bonding material outflow blocking part. Further, the bonding material outflow blocking part may not have line symmetry in shape. The bonding material outflow blocking part having a curved shape should have a portion extending along a direction intersecting with but not orthogonal to the incident direction of the optical signal 2*i* to the optical multiplexer 7, and the portion should have a shape by which the distance from the first bonding surface 23 along the direction parallel to the incident direction increases in advancement along the extending direction of the portion from the first side wall 17 side toward the second side wall 18 side. The first bonding material is prevented from flowing out to the second bonding region 16 through the gap between the laser marking 27*a* and the first side wall 17.

Embodiment 3

A housing of an integrated optical module according to Embodiment 3 will be described with reference to FIG. 6.

Figure 6:
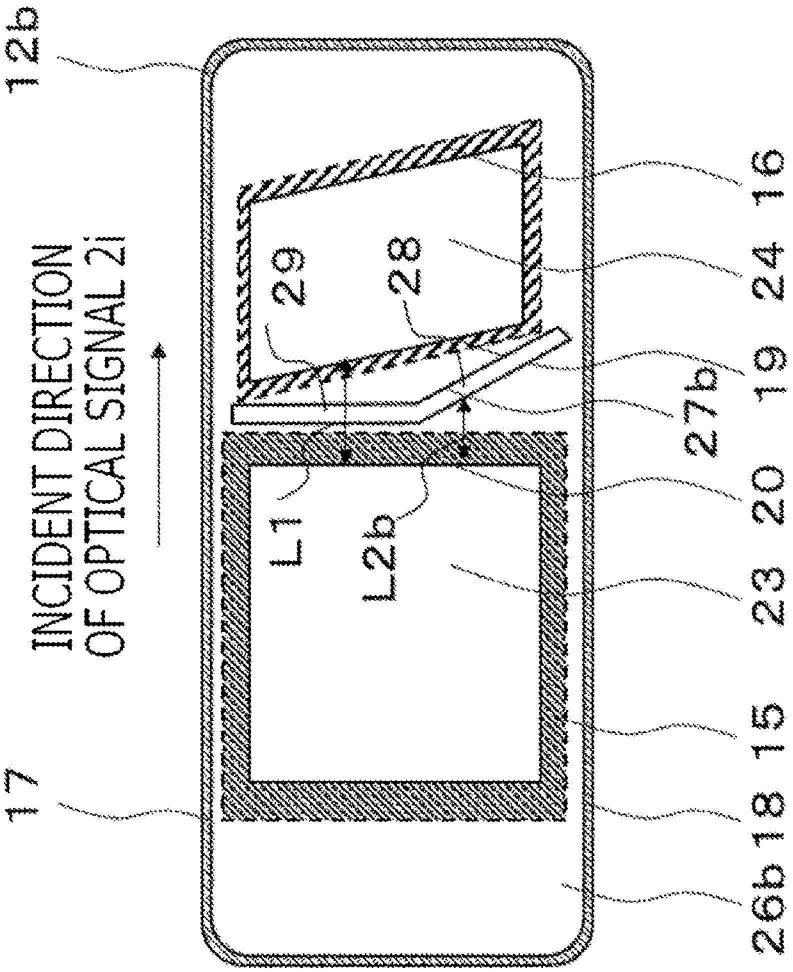
FIG. 6 is a plan view showing a configuration of a mounting surface of a housing in an integrated optical module according to Embodiment 3 of the present disclosure.

FIG. 6 shows a mounting surface 26*b* of a housing 12*b* of the integrated optical module according to the present embodiment. Referring to FIG. 6, the mounting surface 26*b* of the housing 12*b* is different from the mounting surface 26 of FIG. 4 in the shape of a laser marking 27*b*. Other configurations and functions of the integrated optical module 101 are the same as those of the integrated optical module 101 of Embodiment 1, and thus the detailed description thereof will not be repeated.

In Embodiment 3, the laser marking 27*b* is drawn so as to have a portion 28 extending along a direction intersecting with but not orthogonal to the incident direction of the optical signal 2*i* and the other portion 29 that is continuous with the portion 28 and extends while being bent in a direction different from that of the portion 28. That is, as shown in FIG. 6, in the portion 28, a distance L2*b* between the laser marking 27*b* and the first bonding surface 23 along the direction parallel to the incident direction of the optical signal increases in advancement along the extending direction of the portion 28 from the first side wall 17 side toward the second side wall 18 side. Further, the other portion 29 is parallel to the second side 20 of the first bonding surface 23, and the distance L2*b* between the laser marking 27*b* and the first bonding surface 23 along the direction parallel to the incident direction of the optical signal is constant. The laser marking 27*b* is provided away from the first side wall 17 and the second side wall 18.

As a result, the region between the loading part 6 and the laser marking 27*b* spreads from the first side wall 17 side toward the second side wall 18 side. The amount of the first bonding material that can be accumulated between the loading part 6 and the laser marking 27*b* increases, and the concentration of the flow of the first bonding material in the gap between the laser marking 27*a* and the first side wall 17 is alleviated. Therefore, it is possible to suppress the first bonding material from flowing out to the second bonding region 16. In addition, the other portion 29 parallel to the second side 20 of the first bonding surface 23 can be used as a reference for member arrangement. For example, it serves as an arrangement reference when the temperature adjusting element 5 is bonded to the mounting surface 26*b*.

In FIG. 6, the angle between the direction in which the portion 28 extends and the direction in which the second side 20 extends is larger than the angle between the direction in which the first side 19 extends and the direction in which the second side 20 extends, but may be small or equal. The bonding material outflow blocking part should have the portion 28 extending along a direction intersecting with but not orthogonal to the incident direction of the optical signal 2*i* to the optical multiplexer 7, and the portion 28 should have a shape in which the distance from the first bonding surface 23 along the direction parallel to the incident direction increases in advancement along the extending direction of the portion 28 from the first side wall 17 side toward the second side wall 18 side. Thus, the first bonding material is prevented from flowing out to the second bonding region 16 through the gap between the laser marking 27*b* and the first side wall 17.

Embodiment 4

Figure 7:
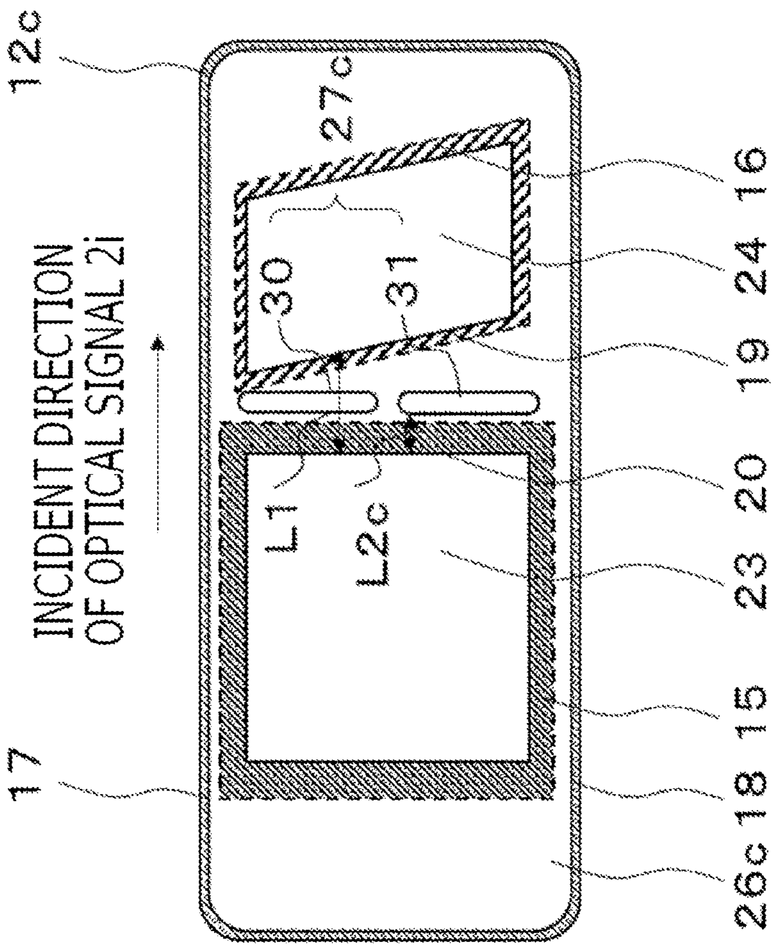
FIG. 7 is a plan view showing a configuration of a mounting surface of a housing in an integrated optical module according to Embodiment 4 of the present disclosure.

A housing of an integrated optical module according to Embodiment 4 will be described with reference to FIG. 7. FIG. 7 shows a mounting surface 26*c* of a housing 12*c* of the integrated optical module according to the present embodiment. Referring to FIG. 7, the mounting surface 26*c* of the housing 12*c* is different from the mounting surface 26 of the integrated optical module 101 of FIG. 4 in the shape of the laser marking 27*c*. Other configurations and functions of the integrated optical module are the same as those of integrated optical module 101 of Embodiment 1, and therefore, detailed description thereof will not be repeated.

In Embodiment 4, the laser marking 27*c* is drawn such that a first portion 30 extends along a direction orthogonal to the incident direction of the optical signal 2*i* and a second portion 31 is provided separately from the first portion 30 and extends along the same direction as the first portion. The laser marking 27*c* is provided away from the first side wall 17 and the second side wall 18. That is, as shown in FIG. 7, the first portion 30 and the second portion 31 are parallel to the second side 20 of the first bonding surface 23, and a distance L2*c* between the laser marking 27*c* and the first bonding surface 23 along the direction parallel to the incident direction of the optical signal is constant.

As a result, the first bonding material is guided not only to the gap between the laser marking 27*c* and the first side wall 17 but also to a gap between the first portion 30 and the second portion 31 where the first bonding region 15 and the second bonding region 16 are distant from each other, so that the concentration of the first bonding material in the gap between the laser marking 27*c* and the first side wall 17 is alleviated. Therefore, it is possible to suppress the first bonding material from flowing out to the second bonding region 16. At this time, since the gap between the first portion 30 and the second portion 31 is farther from the first side 19 of the optical multiplexer 7 than the gap between the first portion 30 and the first side wall 17, even if the first bonding material flows out from the gap between the first portion 30 and the second portion 31, it is not likely that the first bonding material is mixed with the second bonding material. Note that, although the second portion 31 is disposed on the same straight line as the first portion 30 in FIG. 7, for example, the second portion 31 may be disposed on the side far from the second bonding surface 24 with respect to the first portion 30. Furthermore, the first portion 3028 and the second portion 31 that are parallel to the second side 20 of the first bonding surface 23 can be used as a reference for member arrangement. For example, they serve as an arrangement reference when the temperature adjusting element 5 is bonded to the mounting surface 26.

Embodiment 5

Figure 8:
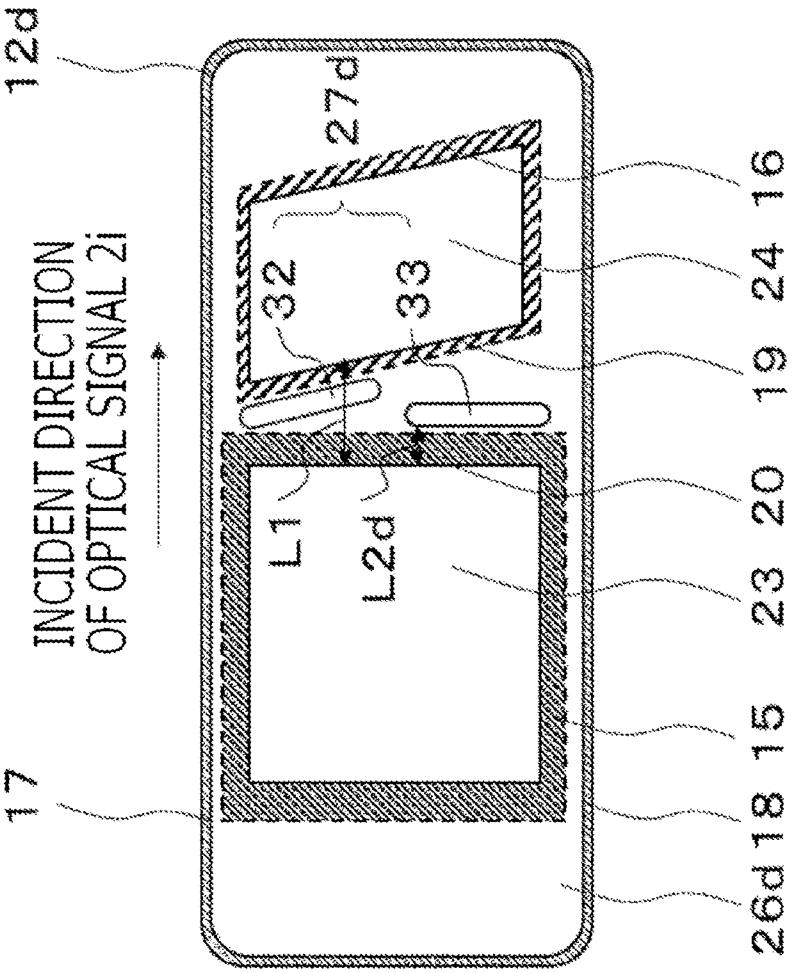
FIG. 8 is a plan view showing a configuration of a mounting surface of a housing in an integrated optical module according to Embodiment 5 of the present disclosure.

A housing of an integrated optical module according to Embodiment 5 will be described with reference to FIG. 8. FIG. 8 shows a mounting surface 26*d* of a housing 12*d* of the integrated optical module according to the present embodiment. Referring to FIG. 8, the mounting surface 26*d* of the housing 12*d* is different from the mounting surface 26 of FIG. 4 in the shape of a laser marking 27*d*. Since other configurations and functions of the integrated optical module are the same as those of Embodiment 1, detailed description thereof will not be repeated.

In Embodiment 5, the laser marking 27*d* has a portion 32 extending along a direction intersecting with but not orthogonal to the incident direction of the optical signal, and the other portion 33 provided separately from the portion 32, and the other portion 33 is drawn so as to extend parallel to the second side 20. That is, as shown in FIG. 8, the portion 32 is drawn in parallel to the first side 19 of the second bonding surface 24, and the other portion 33 is drawn in parallel to the second side 20 of the first bonding surface 23. Therefore, a distance L2*d* between the laser marking 27*d* and the first bonding surface 23 along the direction parallel to the incident direction of the optical signal is constant for the other portion 33, and increases for the portion 32 in advancement along its extending direction from the first side wall 17 side to the second side wall 18 side. Both the portion 32 and the other portion 33 are provided separately from the first side wall 17 and the second side wall 18, and the portion 32 is arranged closer to the first side wall 17 than the other portion 33.

As a result, the region between the loading part 6 and the laser marking 27*d* spreads from the first side wall 17 side toward the second side wall 18 side. The amount of the first bonding material that can be accumulated between the loading part 6 and the laser marking 27*d* increases. Further, since the first bonding material is guided not only to the gap between the laser marking 27*d* and the first side wall 17 but also to a gap between the portion 32 and the other portion 33, the concentration of the flow of the first bonding material in the gap between the laser marking 27*d* and the first side wall 17 is alleviated. Therefore, it is possible to suppress the first bonding material from flowing out to the second bonding region 16.

Further, the region between the other portion 33 and the first side 19 of the second bonding surface 24 is wider than that between the portion 32 and the first side 19. Therefore, even if the first bonding material flows out from the gap between the portion 32 and the other portion 33, the first bonding material can be accumulated in the region between the other portion 33 and the first side 19 of the second bonding surface 24, and thus, even if the first bonding material flows out from the gap between the portion 32 and the other portion 33, it is not likely that the first bonding material is mixed with the second bonding material. Further, the other portion 33 parallel to the second side 20 of the first bonding surface 23 can be used as a reference for member arrangement. For example, it serves as an arrangement reference when the temperature adjusting element 5 is bonded to the mounting surface 26*d*.

Even if the portion 32 is not provided in parallel to the first side 19 of the second bonding surface 24, the angle between the extending direction of the portion 32 and the extending direction of the second side 20 may be smaller or larger than the angle between the extending direction of the first side 19 and the extending direction of the second side 20.

Embodiment 6

Figure 9:
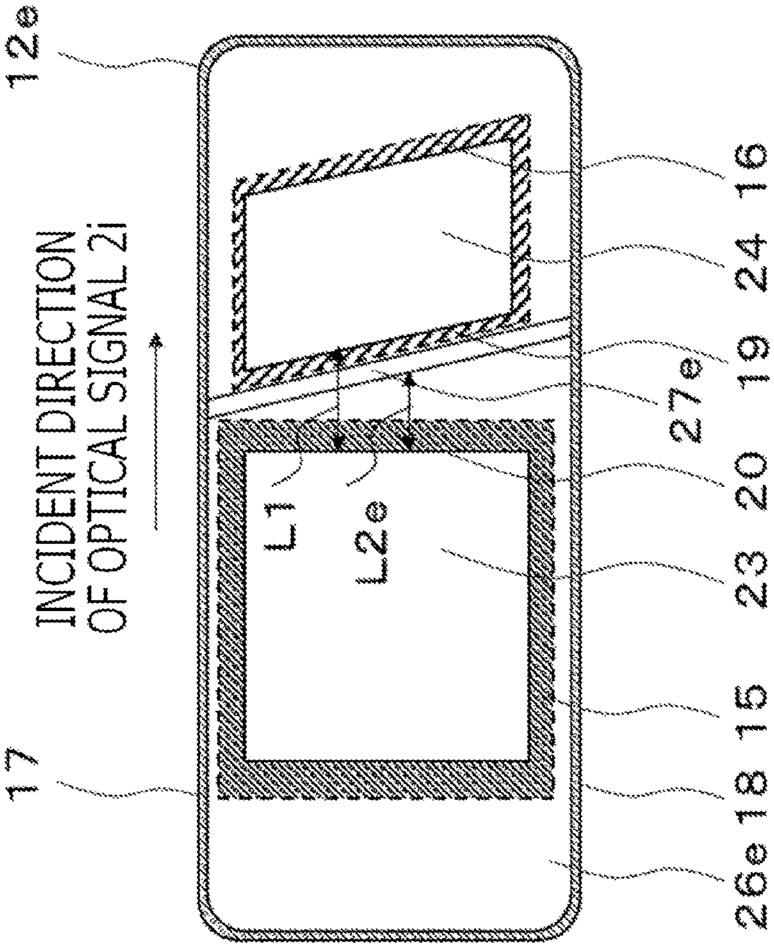
FIG. 9 is a plan view showing a configuration of a mounting surface of a housing in an integrated optical module according to Embodiment 6 of the present disclosure.

A housing of an integrated optical module according to Embodiment 6 will be described with reference to FIG. 9. FIG. 9 shows a mounting surface 26*e* of a housing 12*e* of the integrated optical module according to the present embodiment. Referring to FIG. 9, the mounting surface 26*e* of the housing 12*e* is different from the mounting surface 26 of FIG. 4 in the shape of the laser marking 27*e*. Since other configurations and functions of the integrated optical module are the same as those of Embodiment 1, detailed description thereof will not be repeated.

In Embodiment 1 to Embodiment 5 described above, the case where the laser marking as the bonding material outflow blocking part is provided away from the first side wall 17 and the second side wall 18 has been described, but in Embodiment 6, the laser marking may be provided so as to be in contact with the first side wall 17 and the second side wall 18 as shown in FIG. 9.

When the application amount of the first bonding material is large, there is a possibility that the first bonding material jumps over the laser marking serving as the bonding material outflow blocking part. In particular, in a portion of the first side 19 close to the first side wall 17, the distance L1 between the first side 19 and the second side 20 is smaller than that in other portions. Therefore, if the first bonding material jumps over the laser marking, the first bonding material may be mixed with the second bonding material.

In Embodiment 6, the region between the loading part 6 and the laser marking 27*e* spreads from the first side wall 17 side toward the second side wall 18 side. This increases the amount of the first bonding material that can be accumulated between the loading part 6 and the laser marking 27*e*.

Since the first bonding material is guided to the spread region, the first bonding material is suppressed from jumping over the laser marking 27*e* and flowing into the second bonding region 16. Therefore, it is possible to suppress the first bonding material from flowing out to the second bonding region 16.

The above-described embodiment can also be configured as follows. In Embodiment 1 to Embodiment 3, although the examples in which the bonding material outflow blocking part is formed to be continuous have been described, the bonding material outflow blocking part may be separately formed. An example of a portion to be separated is the central portion located at a point equidistant from both ends of the bonding material outflow blocking part along the bonding material outflow blocking part in Embodiment 1 and Embodiment 2 and is the bent portion of the bonding material outflow blocking part in Embodiment 3.

In addition, in Embodiment 1 to Embodiment 6, the examples in which the bonding material outflow blocking part is formed by the laser marking have been described, but the shape of the bonding material outflow blocking part may be a projection or a recess. The recess is formed by etching the mounting surface 26. The projection is formed by arranging a member on the mounting surface 26.

In addition, combinations, modifications, or omissions of the embodiments are also included in the scope of the technical idea described in the embodiments.

REFERENCE SIGNS LIST

1*i* ($1_0$, $1_1$, $1_2$, $1_3$): light emitting element, 2*i* ($2_0$, $2_1$, $2_2$, $2_3$): optical signal, 3*i* ($3_0$, $3_1$, $3_2$, $3_3$): collimating lens, 4: loading member, 5: temperature adjusting element, 6: loading part, 7: optical multiplexer, 8*i* ($8_0$, $8_1$, $8_2$, $8_3$): filter, 9: mirror, 10: holder, 11: connector, 12, 12*a*, 12*b*, 12*c*, 12*d*, 12*e*: housing, 13: condenser lens, 14: receptacle, 15: first bonding region, 16: second bonding region, 17: first side wall, 18: second side wall, 19: first side, 20: second side, 21: first face, $2_2$: second face, 23: first bonding surface, 24: second bonding surface, 25: hollowed-out portion, 26, 26*a*, 26*b*, 26*c*, 26*d*, 26*e*: mounting surface, 27, 27*a*, 27*b*, 27*c*, 27*d*, 27*e*: laser marking, 28: portion, 29: the other portion, 30: first portion, 31: second portion, 32: portion, 33: the other portion, 101: integrated optical module, L1: distance to the second side along the direction parallel to the incident direction of the optical signal, L2, L2*a*, L2*b*, L2*c*, L2*d*, L2*e*: distance between the laser marking and the first bonding surface along the direction parallel to the incident direction of the optical signal

The invention claimed is:

1. An integrated optical module comprising:

a housing including a mounting surface, and a first side wall and a second side wall that are continuous from the mounting surface and face each other;

a plurality of light emitting elements to emit optical signals each having a different wavelength;

a loading part on which the plurality of light emitting elements are loaded; and an optical multiplexer to multiplex the optical signals emitted from the plurality of light emitting elements, wherein the mounting surface of the housing includes a first bonding region to which a first bonding material for bonding the mounting surface of the housing and the loading part is to be applied, and a second bonding region to which a second bonding material that is made of a different material from the first bonding material for bonding the mounting surface of the housing and the optical multiplexer is to be applied, a bonding surface of the optical multiplexer to be bonded to the mounting surface has a first side parallel to a direction intersecting with but not orthogonal to an incident direction of the plurality of optical signals to the optical multiplexer, a bonding surface of the loading part to be bonded to the mounting surface has a second side facing the first side, a bonding material outflow blocking part is provided on the mounting surface of the housing between the first bonding region and the second bonding region to block bonding material outflow, the loading part and the optical multiplexer are arranged between the first side wall and the second side wall such that the respective bonding surfaces do not overlap in a direction in which the first side wall and the second side wall face each other, the first side is provided such that a distance between the first side and the second side along a direction parallel to the incident direction increases in advancement along the first side from a first side wall side toward a second side wall side, the bonding material outflow blocking part includes a portion extending in a direction intersecting with but not orthogonal to the incident direction, the portion is provided such that a distance between the portion and the bonding surface of the loading part along a direction parallel to the incident direction increases in advancement along the extending direction of the portion from the first side wall side to the second side wall side, and the first bonding material accumulates between the first bonding region and the second bonding region.

2. The integrated optical module according to claim 1, wherein the bonding material outflow blocking part is provided along a direction parallel to the first side.

3. The integrated optical module according to claim 1, wherein the bonding material outflow blocking part is curved.

4. The integrated optical module according to claim 1, wherein the bonding material outflow blocking part includes the other portion that is continuous with the portion and is bent and extends in a direction different from that of the portion.

5. The integrated optical module according to claim 4, wherein the other portion is parallel to the second side.

6. The integrated optical module according to claim 1, wherein the bonding material outflow blocking part includes the other portion provided separately from the portion.

7. The integrated optical module according to claim 6, wherein the other portion extends parallel to the second side.

8. The integrated optical module according to claim 1, wherein the bonding material outflow blocking part is a laser marking.

9. The integrated optical module according to claim 8, wherein the bonding material outflow blocking part is provided away from the first side wall and the second side wall.

10. The integrated optical module according to claim 1, wherein the optical multiplexer comprises:

a plurality of filters;

a mirror; and a holder to fix the plurality of filters and the mirror, wherein the plurality of filters and the mirror multiplex the plurality of optical signals.

11. The integrated optical module according to claim 1, wherein the loading part includes a temperature adjusting element.

12. An integrated optical module comprising:

a housing including a mounting surface;

a plurality of light emitting elements to emit optical signals each having a different wavelength;

a loading part on which the plurality of light emitting elements are loaded; and an optical multiplexer to multiplex the optical signals emitted from the plurality of light emitting elements, wherein the mounting surface of the housing includes a first bonding region to which a first bonding material for bonding the mounting surface of the housing and the loading part is to be applied, and a second bonding region to which a second bonding material that is made of a different material from the first bonding material for bonding the mounting surface of the housing and the optical multiplexer is to be applied, a bonding surface of the optical multiplexer to be bonded to the mounting surface has a first side parallel to a direction intersecting with but not orthogonal to an incident direction of the plurality of optical signals to the optical multiplexer, a bonding surface of the loading part to be bonded to the mounting surface has a second side facing the first side, a bonding material outflow blocking part is provided on the mounting surface of the housing between the first bonding region and the second bonding region to block bonding material outflow, the bonding material outflow blocking part includes a first portion extending along a direction parallel to the second side, and a second portion provided separately from the first portion and extending along a same direction as the first portion, and a distance between the second portion and the first side of the optical multiplexer is greater than a distance between the first portion and the first side of the optical multiplexer, the first bonding material accumulates between the first bonding region and the second bonding region.

13. The integrated optical module according to claim 12, wherein the bonding material outflow blocking part is a laser marking.

14. The integrated optical module according to claim 13, wherein the housing includes a first side wall and a second side wall that are each continuous from the mounting surface and face each other, the loading part and the optical multiplexer are arranged between the first side wall and the second side wall such that the respective bonding surfaces do not overlap in a direction in which the first side wall and the second side wall face each other, and the first portion and the second portion are provided away from the first side wall and the second side wall.

* * * * *